United States Patent
Rodriguez Barquero et al.

(10) Patent No.: US 7,294,286 B2
(45) Date of Patent: Nov. 13, 2007

(54) COCKTAIL COMPOSITION FOR LIQUID SCINTILLATION MEASUREMENTS

(75) Inventors: Leonor Rodriguez Barquero, Madrid (ES); Jose Maria Los Arcos Merino, Madrid (ES)

(73) Assignee: Repsol Quimica, S.A., Madrid (ES)

( * ) Notice: Subject to any disclaimer, the term of this patent is extended or adjusted under 35 U.S.C. 154(b) by 282 days.

(21) Appl. No.: 10/977,562

(22) Filed: Oct. 29, 2004

(65) Prior Publication Data

US 2005/0092967 A1    May 5, 2005

(30) Foreign Application Priority Data

Oct. 29, 2003    (ES) ............................... 200302535

(51) Int. Cl.
*G01T 3/06* (2006.01)
*G01T 1/204* (2006.01)
*C09K 11/06* (2006.01)

(52) U.S. Cl. .................................. 252/301.17
(58) Field of Classification Search ............ 252/301.17
See application file for complete search history.

(56) References Cited

U.S. PATENT DOCUMENTS

| | | | | |
|---|---|---|---|---|
| 3,068,178 A | * | 12/1962 | Kallmann et al. | ..... 252/301.17 |
| 4,271,035 A | | 6/1981 | Saito et al. | |
| 4,443,356 A | | 4/1984 | Mallik et al. | |
| 4,624,799 A | * | 11/1986 | Hegge et al. | .......... 252/301.17 |
| 4,867,905 A | | 9/1989 | Wunderly | |
| 5,135,679 A | | 8/1992 | Mirsky | |

FOREIGN PATENT DOCUMENTS

GB          1222111    *    2/1971

OTHER PUBLICATIONS

Ratel G., 2003. "International Comparison of activity measurements of a solution of $^{204}$Tl". Bureau International des Poids et Mesures Report (in press).

Rodriguez L., Jiménez A. y Grau A., 1996. Separación del $^{210}$Pb, $^{210}$Bi y $^{210}$Po,, mediante columna de cambio ionico y su calibracion por centelleo liquido. Informe Tecnico CIEMAT n°788. CIEMAT. Madrid.

Los Arcos J.M., Rodriquez Barquero L. y Garcia-Torano E., 1995. "CIEMAT Contribution to the EUROMET Project 297 on the LSC Standardization of $^{63}$Ni". Documento DT-MRI-9502.

Rodriguez L., Los Arcos J.M. y Grau Carles A., 1995. "Calibracion del $^{137}$Cs+$^{137m}$Ba por centelleo liquido". Informe Tecnico CIEMAT n°771, CIEMAT, Madrid.

Rodriguez L. y Los Arcos J.M., 1993. "Adsorption Correction in $^{45}$Ca and $^{89}$Sr activity determination by Liquid Scintillation Scounting". In Liquid Scintillation Spectormetry 1992. RADIOCARBON 97-103.

Peng C.T., 1977. "Sample preparation in liquid scintillation counting". The Radiochemical Centre. Amersham, England, pp. 1-6.

Fox B.W., 1976. "Techniques of sample preparation for liquid scintillation counting". North Holland Publ. Co. Amsterdam, pp. 1-6.

Horrocks D.L. 1974. "Applications of Liquid Scintillation Counting". Academic Press. New York, pp. vii-x.

Birks J.B., 1964. "The theory and practice of scintillation counting". Pergamon Press. Oxford, pp. vii-xvi.

* cited by examiner

*Primary Examiner*—C. Melissa Koslow
(74) *Attorney, Agent, or Firm*—John C. McMahon

(57) ABSTRACT

A cocktail composition for liquid scintillation measurements, formed by a solution of a) two solvents, one aromatic and the other one polar, b) one additive enhancing the luminous efficiency, c) two scintillators, one primary and the other one secondary, d) one extracting agent, and e) at least one anionic or non-ionic surfactant. Without prior sample or vial treatments, this cocktail allows direct incorporation of a great number of radionuclides, at least 17, in an hydrochloric or nitric aqueous solution, providing stable samples for a period of several weeks.

11 Claims, No Drawings

COCKTAIL COMPOSITION FOR LIQUID SCINTILLATION MEASUREMENTS

The present invention refers to the radionuclides measurement technique by means of liquid scintillation, and specifically to the composition of a liquid scintillation cocktail suitable for direct preparation and calibration of reference radioactive samples of a great number of radionuclides, without prior treatments.

BACKGROUND OF THE INVENTION

The liquid scintillation technique is extensively used in radioactivity measurements due to its great versatility (Peng, 1977; Fox 1976; Birks 1964; Horrocks 1974).

It is based on the detection of radiation by means of a scintillation cocktail acting as a transducer by converting the disintegration energy in ultraviolet light, which is collected and amplified by means of photomultiplier tubes generating electric pulses.

The conversion is carried out from the initial interaction of the radiation with the main aromatic solvents of the cocktail, transferring its energy by means of excitation, ionization, formation of free radicals and molecular fragments. The excited solvent molecules in electronic states II emit photons in the ultraviolet region, but their yield is usually poor because the emission probability is low, the photon spectral distribution does not fit with the sensitivity range of the photomultiplier tubes, and the emission half-lives are long (tens of ns), facilitating the loss of energy in non-radioactive forms.

Therefore, the cocktail must also include one or more scintillation phosphors which minimize the prior negative effects, increasing the probability of fluorescence, reducing the half-life to a few nanoseconds, and fitting the photon distribution to the range of the photomultiplier tubes.

The electric pulses produced by the photomultiplier tubes are recorded by means of commercial counting equipment or special prototypes, which usually use two or three phototubes, working in a double or triple coincidence manner by means of suitable temporal analysis and amplitude discrimination circuits. As a result, the counting rate is obtained, which is a function of the efficiency of the whole process.

In practice, this technique is applied by means of adding a radioactive sample to a scintillation liquid or cocktail contained within a glass vial (in order to avoid the permeability of plastics), which allows:
fast preparation of the samples,
$4\pi$ measurement geometry,
absence of self-absorption,
suitability to alpha, beta, gamma or electron capture emitters.

In order to take advantage of these advantages, it is necessary to prevent interferences such as inhomogeneity, chemiluminescence, phosphorescence, microprecipitation, adsorption, and chemical (impurities) or color quenching, all of them related to the scintillation cocktail composition and the effects of which are summarized below.

The samples must be homogeneous, with all the components completely dissolved forming a single phase in order to have an optimum $4\pi$ geometry. Chemiluminescence occurs due to chemical reactions between the cocktail components and the sample itself, producing an additional light emission with a very variable duration. Phosphorescence is due to some compounds having a long-lasting photoluminescence. Microprecipitation occurs due to the incompatibility between the radioactive solution and the scintillation cocktail. Adsorption is due to the affinity between the ions contained in the radioactive sample and the active centers of the inner surfaces of the vial. Chemical quenching occurs due to the presence of impurities making the energy-light conversion difficult. Finally, color quenching is due to the insufficient transparency of the scintillation cocktail for the emitted photons.

The scintillation cocktail composition must take into account these possible interferences, whether they are inherent to the cocktail or the result of incorporating the radioactive sample, in order to obtain stable samples for the sufficient time in order to carry out the measurements and controls which may be necessary in that period.

Different patents (U.S. Pat. No. 4,271,035, U.S. Pat. No. 4,443,356, U.S. Pat. No. 4,867,905 and U.S. Pat. No. 5,135,679) disclose scintillation cocktail formulations and compositions, mainly based on one or several organic solvents and one or more dissolved phosphors, as energy-light transducers, and several additives, ionic and non-ionic surfactants, in order to facilitate the emulsification and incorporation of aqueous samples to the organic liquid.

The objective of these formulations is mainly to achieve the maximum efficiency for certain radionuclides and sample types, biological, environmental, etc. This objective is usually achieved by means of applying specific pre-treatments, according to the sample type, and the radionuclide and valence state, or by means of achieving stability for a short period, generally insufficient for its suitable metrological characterization as a reference sample.

Usually, the reference radioactive samples come from aqueous solutions in a weakly acid medium, hydrochloric or nitric acid, with such radioactive concentrations that their measurement does not require incorporating great volumes of solution to the scintillation cocktail. However, such reference samples must be subjected to very accurate verifications, controls, and measurements for relatively long periods, up to several weeks, which can rarely be achieved by means of simple, direct incorporation of the radioactive solution to the cocktails normally used at present, unless a careful study of the pre-treatment specifically required for each radionuclide or sample type in question is carried out, such as silicone application to the vials, addition of stable carriers, supplementary addition of an acid solution, saturation of the walls of the vial, etc., as disclosed in different scientific articles and publications (Rodriguez et al., 1993; Rodriguez et al. 1995; Los Arcos et al. 1995; Rodriguez et al. 1996; Ratel 2003).

On the other hand, the most common cocktails at present are of industrial origin and their production batches have insufficient reproducibility of the purity or proportions of their components in the mixture for metrological accuracy purposes. In many cases, the poorly-controllable perturbation introduced by the pre-treatments in the original cocktail composition and which depends on the radionuclide in question, is added to this. Although these variations can be acceptable for routine measurements, they are intolerable for an accurate characterization of reference samples of the several tens of commonly used radionuclides, especially when it is necessary or convenient to apply calculations which take into account the detailed scintillation cocktail composition to assess parameters such as gamma absorption, ionization quenching and other factors depending on this composition.

Accordingly, although the currently available cocktails generally provide a good immediate counting efficiency, they do not ensure a priori sufficient stability, for several weeks, of the samples prepared by simple, direct addition and furthermore their composition and purity is subject to the variability of the industrial production processes and to the required sample pre-treatment itself. These difficulties constrain or even invalidate their use for an accurate characterization, for a sufficient time, of radioactive reference samples of the several tens of commonly used radionuclides.

DESCRIPTION OF THE INVENTION

In order to prevent the aforementioned difficulties which the standard scintillation cocktails have in their application to the direct counting of radioactive reference samples of very different radionuclides, studies leading to a new composition of the scintillation liquid which solves these drawbacks have been carried out.

According to this, the present invention refers to a new liquid scintillation cocktail, essentially consisting of a solution of (a) two solvents, one aromatic and the other one polar, (b) an additive enhancing the luminous efficiency, (c) two scintillators, one primary and the other one secondary, (d) one extracting agent, and (e) at least one anionic or non-ionic surfactant.

The election of the two solvents, one aromatic and the other one polar, is due to the need to combine the good energy-light conversion efficiency of the aromatic solvent with the capacity of the second solvent to incorporate aqueous or organic samples. It is well known that p-xylene is an aromatic solvent with a high luminous efficiency but with a low capacity for dissolving polar substances. However, acetonitrile, although in itself it is a poor solvent from the point of view of its luminous efficiency, it is soluble in p-xylene and polar substances. The reduction of the luminous efficiency of p-xylene due to the incorporation of acetonitrile is significantly compensated by means of an additive, naphthalene, well known as "co-solvent" due to its good luminous efficiency.

There is a great variety of known phosphors which can be used as scintillators in order to enhance the emission properties of the aforementioned solvents, among which are 2,5-diphenyloxazole (PPO), 2-phenyl-5(4-biphenylyl)-1,3,4-oxiadiazole (PBD), and 2-(4'-t-butylphenyl)-5-(4"-biphenylyl)-1,3,4-oxiadiazole (Butyl-PBD), as primary scintillators capturing the excitation energy of the solvent; and 1,4-di-(2-methylstyryl)-benzene (Bis-MSB), 1,4-di-(2-(5-phenyloxazolyl)-benzene (POPOP), 1,4-di-(2-(4-methyl-5-phenyloxazolyl))-benzene (dimethyl POPOP), as secondary scintillators capturing the photons of the primary scintillators and with reemission peaks between 415 and 430 nm.

In order to ensure the homogeneity and stability of the samples obtained by incorporating radioactive aqueous solution aliquots to the cocktail by means of forming complexes or a uniform emulsion of very fine micelles, the cocktail includes an extracting agent, bis(2-ethylhexyl)-phosphate (HDEHP) and at least one anionic-type surfactant such as sodium dioctylsulphocyanate (SOSS), or non-ionic such as ethoxylated alkylphenol (EAP), triethyl phosphate (TEP) or aliphatic polyoxyethylensorbitane salts (TWEEN).

DESCRIPTION OF A PREFERRED EMBODIMENT

The practical embodiment of the cocktail must allow to obtain samples of a great diversity of radionuclides used as metrological reference, stable for weeks.

By way of example, it must consider at least the following seventeen, commonly used radionuclides or equilibrium mixtures of alpha, beta, electron capture, and gamma emitters:

$^3$H, $^{241}$Am, $^{90}$Sr+$^{90}$Y, $^{90}$Y, $^{204}$Ti, $^{55}$Fe, $^{63}$Ni, $^{14}$C, $^{147}$Pm, $^{109}$Cd, $^{60}$Co, $^{137}$CS, $^{210}$Pb+$^{210}$Bi+$^{210}$Po, $^{210}$Bi, $^{210}$Po, $^{35}$Cl.

The cocktail must allow to incorporate radioactive solution aliquots of these radionuclides by direct addition, without changing their usual physicochemical form, which is usually an hydrochloric or nitric solution with a concentration between 0.1-3M with certain inactive carriers, such as is shown below in Table 1:

TABLE 1

Radioactive solutions usually used

| Radionuclide | Physicochemical form | Inactive carrier |
|---|---|---|
| $^3$H | Water | — |
| $^{241}$Am | Am(NO$_3$)$_3$, HNO$_3$ 1.5 M | — |
| $^{89}$Sr | SrCl$_2$, HCl 1 M | 150 µg/mL Sr$^{2-}$ |
| $^{90}$Sr + $^{90}$Y | SrCl$_2$ + YCl$_3$, HCl 1 M | 75 µg/mL Sr$^{2+}$ + 75 µg/mL Y$^{3+}$ |
| $^{90}$Y | YCl$_3$, HCl 1 M | 150 µg/mL Y$^{3+}$ |
| $^{204}$Ti | TiCl, HCl 0.1 M | 31 µg/mL TiCl |
| $^{55}$Fe | FeCl$_3$ HCl 1 M | 150 µg/mL Fe$^{3+}$ |
| $^{63}$Ni | Ni(NO$_3$)$_2$, HNO$_3$ 1 M | 100 µg/mL Ni$^{2+}$ |
| $^{14}$C | C$_6$H$_{12}$O$_6$, water | 2 µg/mL C$_6$H$_{12}$O$_6$ |
| $^{147}$Pm | PmCl$_3$, HCl 1 M | — |
| $^{109}$Cd | CdCl$_2$, HCl 1 M | 150 µg/mL Cd$^{2+}$ |
| $^{60}$Co | CoCl$_2$, HCl 1 M | 150 µg/mL Co$^{2+}$ |
| $^{137}$Cs + $^{137m}$Ba | CsCl, HCl 1 M | 150 µg/mL Cs$^+$ |
| $^{210}$Pb + $^{210}$Bi + $^{210}$Po | Pb(NO$_3$)$_2$, Bi(NO$_3$)$_2$, HNO$_3$ 3 M | 100 µg/mL Pb$^{2+}$ + 100 µg/mL Bi$^{3+}$ |
| $^{210}$Bi | Bi(NO$_3$)$_3$, HNO$_3$ 3 M | 150 µg/mL Bi$^{3+}$ |
| $^{210}$Po | Bi(NO$_3$)$_2$, HNO$_3$ 3 M | — |
| $^{35}$Cl | NaCl, HCl 0.3 M | 150 µg/mL Cl$^-$ |

Taking into account the usual activity concentrations and the convenience of not significantly changing the initial cocktail composition, the size of the aliquots does not need to exceed 1% of the cocktail volume.

With these requirements, several examples of preferred embodiments of the cocktail have been prepared, XAN-5050, XAN-6535 and XAN-8020, with the compositions shown in Table 2.

TABLE 2

Preferred embodiment examples of the cocktail: XAN-5050, XAN-6535 and XAN-8020

| Component | Product | XAN-5050 | XAN-6535 | XAN-8020 |
|---|---|---|---|---|
| Solvent 1: | p-xylene | 50% by volume | 65% by volume | 80% by volume |
| Solvent 2: | Acetonitrile | 50% by volume | 35% by volume | 20% by volume |
| Additive: | Naphthalene | 80 g/L | 80 g/L | 80 g/L |
| Scintillator 1: | PPO | 10 g/L | 10 g/L | 10 g/L |
| Scintillator 2: | Bis-MSB | 1 g/L | 1 g/L | 1 g/L |
| Extractant: | HDEHP | 47 mL/L | 65 mL/L | 145 mL/L |
| Surfactant: | EAP | 47 mL/L | 65 mL/L | 145 mL/L |

With each one of these cocktails, 15 mL samples have been prepared in glass vials and 100 µL volume aliquots of the radioactive solutions of the seventeen radionuclides of Table 1 have been added directly, without prior treatment.

Samples have been measured by means of two liquid scintillation spectrometers, an LKB 1219 Rackbeta Spectral and a WALLAC 1414, and have remained stable for at least three weeks, both from the point of view of the total count and the spectral analysis, which allows detecting even microprecipitations and adsorptions which can go unnoticed in the total count.

Table 3 shows values of the quenching parameters SQP (E) and the corresponding efficiencies obtained with samples prepared with 100 μl of water tritiated in 15 mL of the cocktails of the preferred formulations XAN-5050, XAN-6535, and XAN-8020 and in the same volume of the well-known cocktails UltimaGold and HiSafe 3, both based on di-isopropyl-naphtalene as solvent, and Insta-Gel Plus, based on pseudocumene:

TABLE 3

Parameters of the preferred formulations XAN-5050, XAN-6535 and XAN-8020, compared with those of standard scintillators

| Sample: $^3H_2O$, volume 100 μl in 15 mL of the cocktail | | Ultima-Gold | HiSafe3 | Insta-Gel Plus | XAN-5050 | XAN-6535 | XAN-8020 |
|---|---|---|---|---|---|---|---|
| LKB-1219 Spectrometer | Quenching parameter SQP(E) | 462 | 460 | 474 | 427 | 442 | 446 |
| | Efficiency | 0.41 | 0.40 | 0.44 | 0.35 | 0.40 | 0.42 |
| WALLAC-1414 Spectrometer | Quenching parameter SQP(E) | 817 | 815 | 827 | 783 | 803 | 805 |
| | Efficiency | 0.44 | 0.42 | 0.48 | 0.37 | 0.42 | 0.44 |

The three preferred embodiment examples confirm that the efficiency of the new cocktail grows almost linearly with the p-xylene content and that even the formulation with lower content, XAN-5050, with an efficiency of 0.35-0.37 (in either spectrometer) for $^3H$, is already perfectly acceptable for measuring the reference samples, furthermore adding the advantage of ease of preparation by direct incorporation of the solutions of a great number of radionuclides, without needing prior treatments which may change the composition and providing stable samples for periods of at least three weeks, sufficient for the necessary metrological tests leading to their certification as reference samples.

On the other hand, the XAN-6535 and XAN-8020 formulations already offer efficiencies for $^3H$ which are comparable to those of compositions including di-isopropyl-naphtalene sold under the registered trademarks Ultima-Gold and HiSafe3, around 0.40-0.42 and 0.42-0.44, respectively, and about 10% lower than those of compositions including pseudocumene sold under the registered trademark Insta-Gel Plus. Particularly, the XAN-8020 formulation provides an efficiency which is 5% higher than that of XAN-6535, always maintaining the already mentioned advantages of direct incorporation and stability of samples for at least three weeks.

Given the properties of the different products proposed for forming a cocktail, as well as the results obtained in the previous examples, other practical embodiments of the cocktail described, changing the proportions of the solvents above 80% of p-xylene and accordingly below 20% of acetonitrile, and suitably changing the other components, or even using the alternative compounds mentioned in the Description of the Invention, must lead to similar results, if not better, than those already shown. Likewise, the naphthalene content can be increased up to 100 g/l.

Preferably, the solvents are p-xylene in a range from 50 to 80% by volume of total solvent with acetonitrile being a remainder or in the range from 50 to 20% by volume. Preferably, HDEHP is in an amount ranging between 47 and 145 milliliters per liter (mL/L) and EAP is in an amount ranging from 47 and 145 milliliters per liter.

The invention claimed is:

1. A cocktail composition for liquid scintillation measurements, formed by a solution comprising:
   a) an aromatic solvent and a polar solvent wherein the aromatic solvent is p-xylene and the polar solvent is acetonitrile,
   b) an additive to enhance luminous efficiency,
   c) a primary scintillator and a secondary scintillator,
   d) bis(2-ethylhexyl)-phosphate, and
   e) at least one surfactant selected from the group consisting of anionic and non-ionic surfactants.

2. The cocktail composition for liquid scintillation measurements according to claim 1, wherein the additive is naphthalene.

3. The cocktail composition for liquid scintillation measurements according to claim 2, wherein the primary scintillator is selected from the group consisting of 2,5-diphenyloxazole, 2-phenyl-5(4-biphenylyl)-1,3,4-oxiadiazole, and 2-(4'-t-butylphenyl)-5-(4"-biphenylyl)-1,3,4-oxiadiazole, and the secondary scintillator is selected from the group consisting of 1,4-di-(2-methyistyryl)-benzene, 1,4-di-(2-(5-phenyloxazolyl)-benzene, and 1,4-di-(2-(4-methyl-5-phenyloxazolyl))-benzene.

4. A cocktail composition for liquid scintillation measurements, formed by a solution comprising:
   a) a first aromatic solvent and a second polar solvent wherein the aromatic solvent is p-xylene and the polar solvent is acetonitrile,
   b) an additive comprising naphthalene to enhance luminous efficiency,
   c) a primary scintillator, selected from the group consisting of 2,5-diphenyloxazole; 2-phenyl-5(4-biphenylyl)-1,3,4-oxiadiazole; and 2-(4'-t-butyiphenyl) -5-(4"-biphenylyl)-1,3,4-oxiadiazole and a secondary scintillator selected from the group consisting of 1,4-di-(2-methylstyryl)-benzene; 1,4-di-(2 -(5-phenyloxazolyl)-benzene; and 1,4-di-(2-(4-methyl-5 -phenyloxazolyl) ) -benzene,
   d) an extracting agent comprising bis(2-ethylhexyl)-phosphate, and
   e) at least one surfactant selected from the group consisting of anionic and non-ionic surfactants.

5. The cocktail composition for liquid scintillation measurements according to claim 4, including at least one surfactant selected from the group consisting of sodium di-octylsulphocyanate, ethoxylated alkyl phenol, triethyl phosphate and polyoxyethylensorbitane salts.

6. The cocktail composition for liquid scintillation measurements according to claim 5, wherein the solvents include p-xylene in the range between 50 and 80%, and accordingly acetonitrile in the range of between 50 and 20% by volume of a mixture formed of the p-xylene and acetonitrile.

7. The cocktail composition for liquid scintillation measurements according to claim 6, wherein naphthalene is added to the mixture of solvents in an amount between 80 and 100 g/L.

8. The cocktail composition for liquid scintillation measurements according to claim 7, including 10 g/L of 2,5-diphenyloxazole and 1 g/L of 1,4-di-(2-methylstyryl)-benzene.

9. The cocktail composition for liquid scintillation measurements according to claim 8, including the extracting agent bis(2-ethylhexyl)-phosphate is added in an amount ranging between 47 and 145 mL/L.

10. The cocktail composition for liquid scintillation measurements according to claim 9, including the surfactant ethoxylated alkyl phenol, in the amount ranging between 47 and 145 mL/L.

11. A cocktail composition for liquid scintillation measurements, formed by a solution characterized by comprising:
   a) an aromatic solvent and a polar solvent mixture wherein the aromatic solvent is p-xylene and the polar solvent is acetonitrile,
   b) an additive to enhance luminous efficiency,
   c) a primary scintillator and a secondary scintillator,
   d) an extracting agent comprising bis(2-ethylhexyl) phosphate, and
   e) at least one surfactant selected from the group consisting of anionic and non-ionic surfactants.

* * * * *

UNITED STATES PATENT AND TRADEMARK OFFICE
CERTIFICATE OF CORRECTION

| | | |
|---|---|---|
| PATENT NO. | : 7,294,286 B2 | |
| APPLICATION NO. | : 10/977562 | |
| DATED | : November 13, 2007 | |
| INVENTOR(S) | : Leonor Rodriguez Barquero and Jose Maria Los Arcos Merino | |

It is certified that error appears in the above-identified patent and that said Letters Patent is hereby corrected as shown below:

On Title page under

(73) ASSIGNEE:   should read

<u>CENTRO DE INVESTIGACIONES ENERGETICAS</u>
        <u>MEDIOAMBIENTALES Y TECHNOLOGICAS</u>

Signed and Sealed this

Tenth Day of February, 2009

JOHN DOLL
*Acting Director of the United States Patent and Trademark Office*